United States Patent [19]

Robinson

[11] Patent Number: 5,029,241
[45] Date of Patent: Jul. 2, 1991

[54] HEAT-SHRINKABLE REPAIR COVER FOR PRESSURIZED CABLES

[75] Inventor: Joseph-Gordon Robinson, Cheltenham, Great Britain

[73] Assignee: RXS Schrumpftechnik-Garnituren GmbH, Fed. Rep. of Germany

[21] Appl. No.: 487,539

[22] Filed: Mar. 2, 1990

[30] Foreign Application Priority Data

Mar. 3, 1989 [GB] United Kingdom ............... 8904837
Jul. 24, 1989 [GB] United Kingdom ............... 8916846

[51] Int. Cl.$^5$ ........................................ H02G 15/113
[52] U.S. Cl. .................... 174/92; 174/88 R; 174/DIG. 8
[58] Field of Search ............ 174/92, 93, 88 R, DIG. 8

[56] References Cited

U.S. PATENT DOCUMENTS 4,232,712 11/1980 Squires ......................... 174/DIG. 8
4,413,028 11/1983 Diaz ............................. 174/88 R X
4,511,611 4/1985 Moisson ........................... 174/92 X
4,626,458 12/1986 Pithouse et al. ................ 174/92 X
4,792,472 12/1988 Meltsch ............................ 174/92

FOREIGN PATENT DOCUMENTS 1506242 4/1978 United Kingdom .

Primary Examiner—Morris H. Nimmo
Attorney, Agent, or Firm—Hill, Van Santen, Steadman & Simpson

[57] ABSTRACT

A heat-shrinkable, wrap around sleeve is formed of a cross-linked corrugated layer of polyolefin extending between two cross-linked layers of homogeneous plastic material with an elongation at least equal to that of the corrugated polyolefin layer. Preferably, the corrugations extend at an angle, which is preferably a right angle, to the longitudinal edges of the sleeve and in the direction of stretching of the sleeve prior to it being heat-shrunk onto the joint.

29 Claims, 2 Drawing Sheets

HEAT-SHRINKABLE REPAIR COVER FOR PRESSURIZED CABLES

BACKGROUND OF THE INVENTION

The present invention is directed to an improved design of a joint cover for use, particularly on pressurized telecommunication cables.

It is occasionally necessary to repair telecommunication cables and other cables. Since a repair involves the removal of some of the protective cable sheath, it is, therefore, necessary to provide the resultant joint with a cover having excellent resistance to moisture ingress and resistance to mechanical damage, ideally for the life of the cable.

It is possible to provide protection against moisture ingress to telecommunication cable joints by providing a wrap-around, heat-shrinkable sleeve and by placing this sleeve so that it is wrapped around the joint and also extends some way along the entrance and exit cables. An example of such an arrangement is disclosed in British Patent Specification 1,506,242. The longitudinal edges of the sleeve are fastened tightly together by means of a flexible C-shaped metal channel or clip. On heating with a propane flame, for example, the sleeve will shrink and, together with an adhesive which is on the interior surface, forms a water-tight cover over the joint. The effectiveness of such a joint cover may be assessed by pressurizing the cover to about 6 psi with air and thermally cycling the pressurized joint cover in water from 5° C. to 60° C. The pressure loss for satisfactory joints should not exceed 1 psi after 10 cycles, with each cycle being of a duration of four hours. This type of a test is carried out to evaluate joint covers used on distribution cables, even though the cables ar not normally pressurized.

In the case of telecommunication transmission systems, the cables are usually permanently pressurized to 10 psi to ensure that, even in the event of damage, water will be kept out. The suitability of the repair joint cover for use on transmission lines may be assessed by pressurizing the cover to 10 psi and then cycling the pressurized cover between −40° C. and 60° C. in air. No measurable pressure loss should occur after 10 cycles, with each cycle having a duration of 8 hours. Other thermal cycling tests for assessing the air retention effectiveness by these joint covers are used. A further requirement and, particularly, demanding one is that the pressurized joint cover should have excellent creep resistance so that it does not move or distort, ideally for the life of the cable.

To meet the exacting requirements for joint covers to be used on pressurized telecommunication cables, many systems have been used. For example, iron sections have been bolted together around the joint together with collars and adhesive coated tapes used to seal the inlet and outlet cables. This type of cover joint has the drawbacks of being rigid and being difficult to assemble. Also, this type of joint cover, which needs a large number of different size components to cater for the range of cable size being used, thus, requires a large amount of storage space, which can prove inconvenient.

SUMMARY OF THE INVENTION

The present invention is directed to a joint cover for pressurized telecommunication cables which will overcome the abovementioned drawbacks. The invention provides a sleeve which has a high resistance to creep, a high resistance to crushing and to punch through and, in addition a sleeve which has exceptional resistance to splitting during the heat-recovery operation. The sleeve of the invention is suitable for protecting repair joints on pressurized telecommunication transmission cables installed either underground or exposed to direct sunlight in temperate climates.

In particular, the invention is directed to a heat-shrinkable, wrap-around sleeve produced from a polyolefin composite. The longitudinal edges of the wrap-around sleeve are held together by means of a flexible C-shaped metal channel, which will run along a continuous neck or flange on both longitudinal edges. The polyolefin composite is constructed of a heat-shrinkable corrugated or ridged sheet which is sandwiched between two plane layers of plastic material. The corrugations or ridges run essentially parallel to one another and they undulate from the top surface of the sheet to the bottom surface, whereby a crest is followed directly by a trough. Alternatively, there may be interruptions in the progress from the crest to the trough. There may be definite lateral separations between the ridges or corrugations. The shape of the cross sections at right angles to the longitudinal direction of the corrugation or ridge may be triangular, parabolic, part-circular, or a combination of two or three of these shapes, or can even be an irregular shape.

The corrugations or ridges preferably cover the entire surface of the heat-shrinkable sheet, and their direction is preferably at an angle of 90° to the longitudinal edges of the heat-shrinkable sheet, but any other angle to the longitudinal edge may be used. The outer sheets and the corrugated or ridges sheet should, preferably, have similar chemical and heat-shrinkable properties. Suitable materials are: high density polyethylene for the heat-shrinkable corrugated or ridged sheet and low density polyethylene for the outer two sheets. Other suitable pairs of materials are readily selected by those skilled in the art.

With this construction comprising a heat-shrinkable corrugated or ridged polymer sheet sandwiched between two plane plastic layers, it has been found, surprisingly, that the resultant composite wrap-around heat-shrinkable sleeve, when coated with an adhesive and assembled by heat shrinking over a liner around a transmission telecommunication cable joint, can withstand the hoop stresses generated by high internal pressures without any creep or distortion. It also has excellent pressure retention characteristics. A similar composite construction, but in a tubular form, may also be used on pressurized cables, providing it can be pushed over the cable leading to the joint.

The heat-shrinkable corrugated sheet of high density polyethylene can be made by stretching an extruded strip of a thickness range of 2 mm to 5 mm, preferably by a range of 300% to 600% at right angles to its longitudinal edges. Immediately following the stretching or, simultaneously therewith, corrugation indentations are applied to the sheet. Both operations are carried out below the crystalline melting point of the polymer. The direction of corrugation is preferably at right angles to the longitudinal edges of the sheet. The corrugated sheet is then cross-linked by exposure to a radiation dose in a range of 5 to 30 Mrad or more, preferably in a range of 5 to 10 Mrad.

Alternatively, the extruded strip of high density polyethylene may be first cross-linked, then heated above its crystalline melting point and stretched, preferably in a range of 300% to 600% at right angles to its longitudinal edges. Following by or simultaneously with the stretching, the corrugated indentations are applied to the surface. After stretching and forming corrugation into the sheet, the sheet is then cooled while still under tension to less than 80° C. The direction of the corrugations is preferably at right angles to the longitudinal edges of the sheet.

The overall thickness of the heat-shrinkable corrugated sheet is preferably between 2 mm and 15 mm and, more preferably, in a range of 3 mm to 10 mm. The thickness of the material of the corrugated sheet is preferably 0.1 mm to 3 mm and, more preferably, of 0.2 mm to 1.5 mm, with a separation between the crest of the corrugations or ridges preferably in a range of 3 mm to 30 mm and, particularly when the crests are followed directly by the troughs without interruptions. In other case of the optimum separation of the corrugations may be different and will depend on the particular corrugation profile, on the thickness of the corrugated sheet and on the amount of stretching employed to make it heat-shrinkable. The suitable separation will readily be determined by those skilled in the art.

A layer of low density polyethylene, preferably with a thickness in a range of 0.2 mm to 1.5 mm, is bonded to both the top and bottom faces of the heat-shrinkable sheet by press lamination or by powder coating or by roller coating from the melt and then cross-linked by exposure to an electron beam or gamma radiation to prevent the low density polyethylene sheet from melting, running or dripping during the heat shrinking. The preferred level of radiation is in the range of 2 to 10 Mrad and, more preferably, in a range of 3 to 6 Mrad.

The heat-shrinkable polyolefin composite can also be prepared in a single step. For this purpose, the composite comprising low density polyethylene sheets and a sandwiched strip of corrugated sheet of high density polyethylene are exposed to radiation doses in the range of 5 to 20 Mrad. Then the composite is converted to heat-shrinkable form by stretching it in a range of 300% to 600% in the direction at right angles to the longitudinal edges of the strip at a temperature above the crystalline melting point of the high density polyethylene. Thereafter, it is cooled to less than 80° C. while still retaining the stretching force.

Materials other than low density polyethylene may be used to sandwich the heat-shrinkable corrugated sheet to produce a composite wrap-around sleeve, and these include, but are not restricted to, ethylene-vinyl acetate copolymers, ethylene-ethyl acrylate copolymers, linear low density polyethylene, very low density polyethylene, medium density polyethylene, high density polyethylene, and polyesters. All of these materials or blends thereof, or other polymeric materials, may be bonded to the corrugated or ridged sheet, cross-linked by exposure to a high energy electron beam or gamma radiation to prevent melting or flowing during heat shrinking.

More than one layer of corrugated or ridged sheets may be used in the construction of the heat-shrinkable, wrap-around composite sleeve. The sheets may be in intimate contact or they may not actually touch but be connected together using, for example, the polymer constituting the outer sheets or an adhesive.

The surface of the heat-shrinkable wrap-around sleeve which will contact the cable joint is coated with a layer of high-performance adhesive with a thickness of 0.1 mm to 1.0 mm. The adhesive is preferably a hot-melt type, and suitable adhesive may be, for example, based on a polyamide or ethylene-vinyl acetate copolymers. During the heat-shrinking process, the adhesive flows to form a seal between the heat-shrinkable sleeve and the substrate.

A liner is used in conjunction with the heat-shrinkable wrap-around sleeve. The liner is preferably, but not necessarily, made of a rigid cardboard or similar material with creases running lengthwise at lateral separations of about 20 mm to facilitate neat wrapping around the repaired joint of the cable. The ends of the liner have long narrow triangular pieces cut out to form a coronet on either end so that they readily smooth out the transitions from the maximum joint size to the size of the exit and entrance cables, as show. In order to further enhance the air impermeability of the joint cover system, the liner may be coated with a layer, preferably in a range of thickness of 0.05 mm to 1.0 mm thick of an impermeable polymer, but not exclusively, of a copolymer of a vinylidene chloride and acrylonitrile or a copolymer of vinylidene chloride and vinyl chloride. The corrugated layer or sheet of polyolefin extends between two outer sheets or layers of a homogeneous plastic material with an elongation at least equal to that of the corrugated polyolefin layer. The corrugation of the polyolefin sheet can be either completely fitted or partially fitted with a homogeneous polymeric material to form a laminate. This polymeric material will have an elongation at least equal to that of the corrugated polyolefin sheet and may be cross-linked after being disposed in the corrugations.

Other advantages and features of the invention will be readily apparent from the following description of the preferred embodiments, the drawings and claims.

DESCRIPTION OF THE PREFERRED EMBODIMENTS

Figure 1:
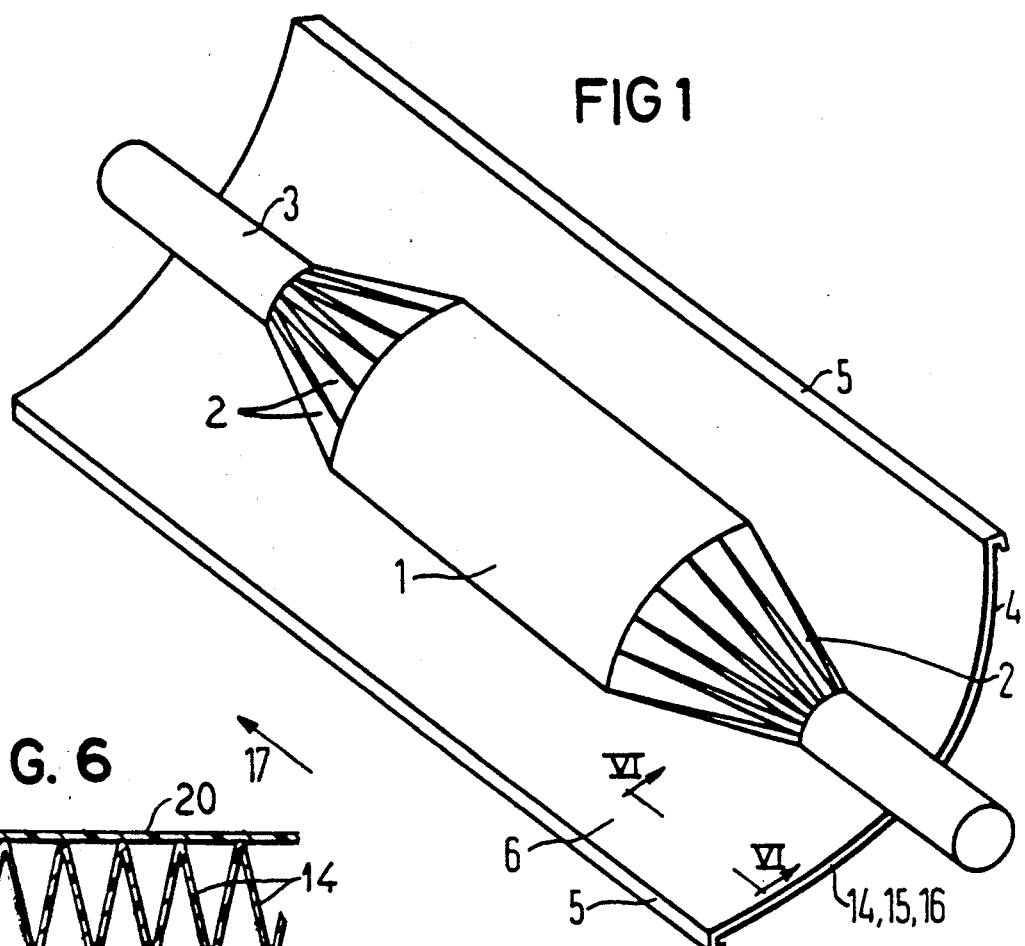
FIG. 1 is a perspective view of the wrap-around sleeve of the present invention in a partially wrapped-around condition on a joint between cable.
Figure 2:
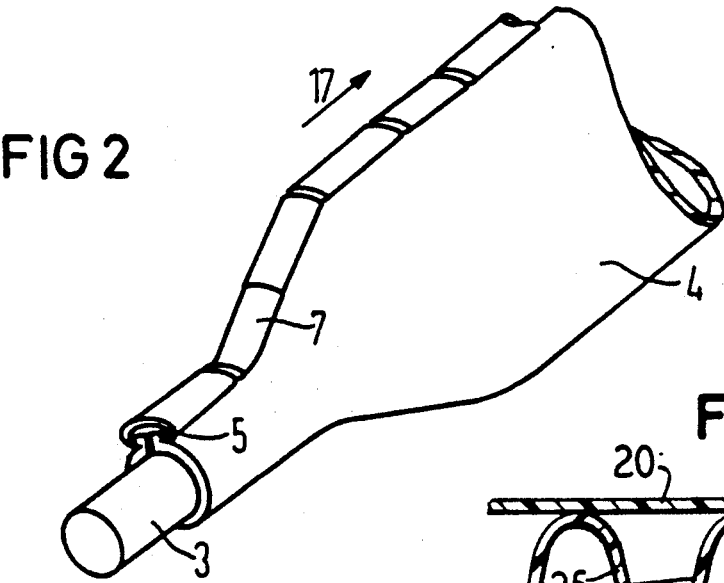
FIG. 2 is an end perspective view of the sleeve of the present invention as wrapped onto a cable.

The principles of the present invention are particularly useful when incorporated in a composite heat-shrinkable sleeve 4, which is illustrated in FIG. 1. In the embodiment of FIG. 1, the sleeve 4 is wrapped around a liner 1, which is formed of cardboard and has a cylindrical portion with end portions formed of long triangular pieces 2 for enabling a smooth transmission from the large diameter portion of the joint to the diameter of the cables 3. The composite heat-shrinkable sleeve 4 has necks or flanged edges 5 extending lengthwise along the longitudinal edges of the sheet. The sleeve 4 is positioned with an adhesive layer 6 on an inner surface for contacting the joint. As illustrated in FIG. 2, the sleeve 4 is wrapped around and held by the flexible metal channel 7 engaging the ribbed or flanged edges 5 and then is heat-shrunk down onto the liner 1.

Figure 6:
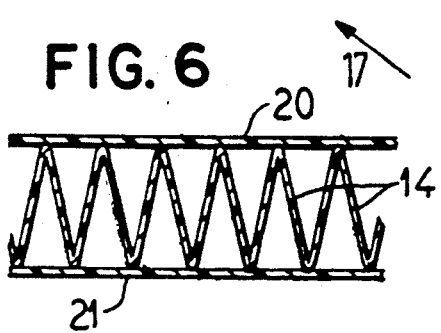
FIG. 6 is a cross sectional view taken along the lines VI—VI of FIG. 1.
Figure 3:
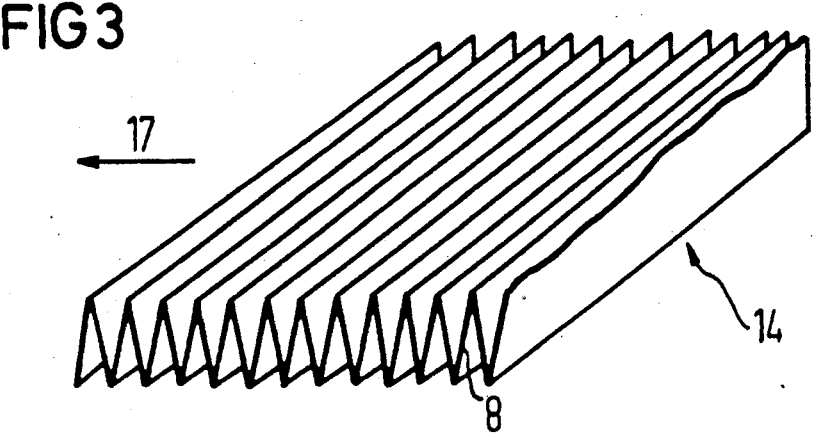
FIG. 3 is a perspective view of one embodiment of a corrugated sheet of the present invention.

As illustrated in FIG. 6, the composite sheet 4 is formed by a corrugated sheet 14 which is interposed between a pair of outer sheets 20 and 21. As illustrated in FIG. 3, the corrugated sheet 14 has corrugations or ridges 8 which have a triangular configuration and extend with a substantially straight edge between the top of each corrugation engaging the sheet 20 and a lower crest which engages the sheet 21.

Figure 4:
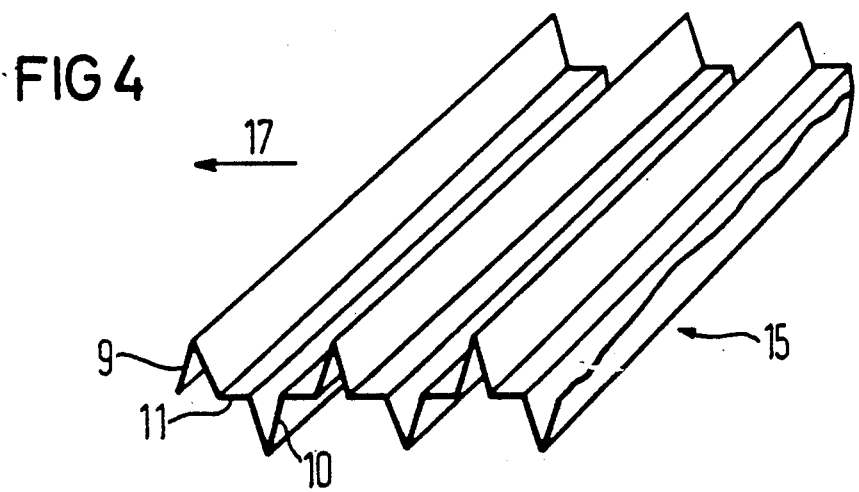
FIG. 4 is a perspective view of another embodiment of the corrugated sheet of the present invention.
Figure 5:
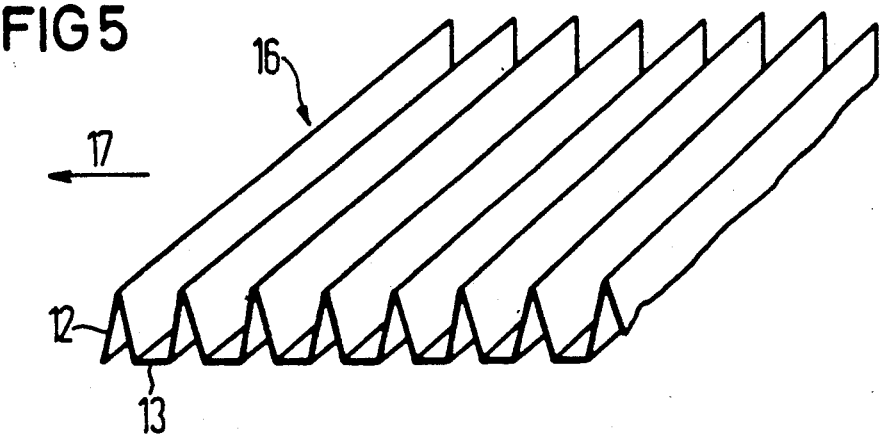
FIG. 5 is a perspective view of a third embodiment of a corrugated sheet in accordance with the present invention.

The corrugated sheet can have other shapes, as illustrated by the sheet 15 of FIG. 4, or the sheet 16 of FIG. 5. In the embodiment of FIG. 4, the corrugations have upward triangular folds 9 separated from the downward folds 10 by a lateral, uncorrugated portion 11. Thus, the sides of the folds 9 are offset by the portion 11 from the adjacent side of the folds forming the corrugation 10.

In another embodiment of FIG. 5, the corrugations 12 are separated by uncorrugated regions 13 so that the corrugated sheet 16 will have a rather large flat crest 13 engaging one of the two sheets and the sharp pointed crest engaging the other of the two sheets.

Figure 7:
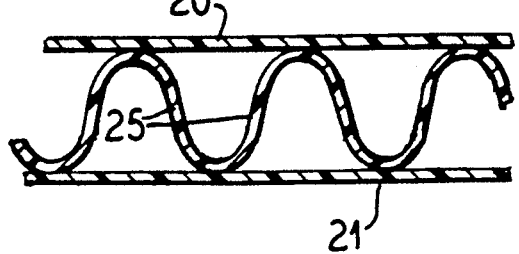
FIG. 7 is a cross sectional view similar to FIG. 6 of another embodiment of the sandwich of the corrugated sheet in accordance with the present invention.

In these three embodiments, the corrugations all have substantially straight sides. However, if desired, the corrugations can have a curved or rounded crest, such as the hyperbolic shaped corrugations 25 illustrated in FIG. 7. It is also possible to combine the straight corrugations of the embodiments, such as FIGS. 3, 4 and 5, with the curved embodiments, or to have irregular-shaped corrugations. In all cases, the corrugations extend at right angles to the longitudinal edge, which is signified by the arrow 17 in FIGS. 3, 4 and 5, as well as FIG. 1.

After the sleeve 4 has been wrapped and shrunk onto the liner, such as 1, around the joint, in order to pressurize the joint, an air valve is passed through a hole which is drilled in the wrap-around sleeve and liner. This air valve is sealed in position using conventional techniques to form an air-tight seal.

EXAMPLE 1

100 parts by weight of a high density polyethylene (density 0.96 lg/cc and melt flow index of 16 grm/10 minutes at 190° C./2.16 kg) were blended on a two-roll mill with 2.0 parts of Corax P, which is a carbon black available from the firm Degaussa; 2.0 parts of Flectol-H, which is an antioxidant available from Monsanto PLC; 0.5 parts of dilauryl thiodipropionate; and 5.0 parts of triallyl cyanurate. The resultant blend was granulated and thereafter extruded as a strip with a width of 48 mm and a thickness of 2.5 mm and has a continuous running neck or flange along each of the two longitudinal edges.

The strip was then stretched at right angles to the longitudinal edges to a width of 170 mm with corrugation indentations of the surface being carried out immediately thereafter. Both operations were carried out at a temperature below the crystalline melting point of the polymer. The corrugation direction was at right angles to the longitudinal edges. The corrugation profile was triangular, as shown in FIG. 3, and had a separation of 15 mm between each corrugation ridge and the overall thickness of the sheet was 5.5 mm.

The corrugated sheet was cross-linked by exposure to gamma radiation at a dose of 10 Mrad to provide the required heat-shrinkable corrugated sheet.

100 parts of low density polyethylene (density 0.916 g/cc and a melt flow index of 10 grm/10 min at 190° C./2.16 kg) were blended on a two-roll mill with 2.0 parts of Corax P, 2.0 parts of Irganox 1010, which is an antioxidant available from Ciba Geigy PLC, and 1.0 parts of dilauryl thiodipropionate. The resultant blend was granulated and extruded as a sheet of a thickness of 1.0 mm.

A sheet of this material with an overall length of 450 mm was pressed between PTFE covered plates in a press at 155° C. into each face of the heat-shrinkable corrugated sheet to completely cover it. The resultant composite was cooled to room temperature in the press and thereafter exposed to radiation dosage of 3 Mrad. An air valve was then fitted to give a heat-shrinkable wrap-around sleeve, the interior surface of which was coated with a layer of polyamide hot-melt adhesive having a thickness of 0.4 mm.

A joint on a length of polyethylene sheathed telecommunication cable was surrounded by a hard cardboard liner, such as the liner 1 of FIG. 1. The air valve also passed through the liner as the sleeve was wrapped around and held by the clamps or channels 9. After assembly and heat shrinking, the joint was pressurized to 10 psi through an air valve and cycled between −40° C. and 60° C. for 120 cycles, with each cycle having a duration of 8 hours. After this test, the cover joint was pressurized to 15 psi and immersed in water and cycled between 5° C. and 50° C. for 100 cycles. The joint pressure was registered on a pressure gauge attached to the cable body. No loss of pressure was observed at the end of these thermal cycling tests and, moreover, no creep was detected.

EXAMPLE 2

The above test was repeated, but employing a heat-shrinkable sheet with corrugations of the configuration illustrated in FIG. 4, in which the upward corrugations 9 were separated from the down corrugations 10 by uncorrugated lateral portions 11. No pressure loss was recorded after the thermal cycling tests and only minimum creep was observed.

EXAMPLE 3

The above tests were, again, repeated, but employing a heat-shrinkable sheet with corrugations as shown in FIG. 5, which have the corrugations 12 which were separated by the uncorrugated regions 13. No pressure losses were recorded after the thermal cycling tests and no creep was detected.

Although various minor modifications may be suggested by those versed in the art, it should be understood that I wish to embody within the scope of the patent granted hereon all such modifications as reasonably and properly come within the scope of my contribution to the art.

I claim:

1. A heat-recoverable, wrap-around sleeve comprising a corrugated plastic layer sandwiched between two layers of plastic material and having a grooved flange along both longitudinal edges for gripping by a flexible metal channel so as to hold the edges in close proximity during heat recovery of the sleeve.

2. A heat-recoverable, wrap-around sleeve according to claim 1, wherein the corrugated plastic layer is a polyolefin sheet.

3. A heat-recoverable, wrap-around sleeve according to claim 2, wherein the separation between the tops of the corrugations is in the range of 0.25 mm to 30 mm.

4. A heat-recoverable, wrap-around sleeve according to claim 2, wherein the corrugations extend parallel to each other.

5. A heat-recoverable, wrap-around sleeve according to claim 2, wherein the corrugations extend at an angle of 90° to a longitudinal edge of the corrugated polyolefin sheet.

6. A heat-recoverable, wrap-around sleeve according to claim 2, wherein the corrugations are at an angle to the longitudinal edges of the corrugated polyolefin sheet.

7. A heat-recoverable, wrap-around sleeve according to claim 2, wherein the corrugations extend across the entire surface of the corrugated polyolefin sheet and between the flanges along each of the longitudinal edges.

8. A heat-recoverable, wrap-around sleeve according to claim 2, wherein the corrugations undulate from the top to the bottom surface of the polyolefin sheet, whereby a crest is followed directly by a trough.

9. A heat-recoverable, wrap-around sleeve according to claim 2, wherein there is an interruption in the progress from the crest to a trough of each corrugation.

10. A heat-recoverable, wrap-around sleeve according to claim 2, wherein there is a lateral separation between some of the corrugations.

11. A heat-recoverable, wrap-around sleeve according to claim 2, wherein there is a lateral separation between all of the corrugations.

12. A heat-recoverable, wrap-around sleeve according to claim 2, wherein a cross sectional taken at right angles to the longitudinal direction of the corrugations has the corrugations with a triangular shape.

13. A heat-recoverable, wrap-around sleeve according to claim 2, wherein the corrugations have a cross section at right angles to the longitudinal direction of the corrugations with a part-circular shape.

14. A heat-recoverable, wrap-around sleeve according to claim 2, wherein the shape of the corrugations in cross section at right angles to the longitudinal direction is a combination of two or more shapes.

15. A heat-recoverable, wrap-around sleeve according to claim 2, wherein the corrugations have an irregular shape in the cross section extending at angles to the direction of corrugations.

16. A heat-recoverable, wrap-around sleeve according to claim 2, wherein the corrugated polyolefin sheet is cross-linked.

17. A heat-recoverable, wrap-around sleeve according to claim 2, wherein the corrugated polyolefin sheet is heat-recoverable.

18. A heat-recoverable, wrap-around sleeve according to claim 2, wherein the corrugations of the polyolefin sheet are completely filled with a homogeneous polymeric material to form a laminate.

19. A heat-recoverable, wrap-around sleeve according to claim 2, wherein the corrugations of the polyolefin sheet are partly filled with a homogeneous polymeric material to form a laminate.

20. A heat-recoverable, wrap-around sleeve according to claim 19, wherein the polymeric material used to partially fill the corrugations of a sandwiched layer of the corrugated polyolefin sheet has an elongation at least equal to that of the corrugated polyolefin sheet.

21. A heat-recoverable, wrap-around sleeve according to claim 19, wherein the homogeneous polymeric material used to partially fill the corrugations in the sandwiched layer of the corrugated polyolefin sheet is cross-linked after being disposed in the corrugations.

22. A heat-recoverable, wrap-around sleeve according to claim 1, in which the heat-recoverable, wrap around sleeve has a layer of heat-reactive adhesive on an inner surface.

23. A junction between an elongated members comprising two elongated members being joined end-to-end, a wrap-around sleeve comprising a corrugated plastic layer sandwiched between two layers of plastic material, said sleeve having grooved flanges along the longitudinal edges, said sleeve surrounding the junction and a flexible metal channel holding the flanges in close proximity during a heat recovery of the sleeve to form a tight fit on said junction.

24. A junction according to claim 23, in which the members are electrical cables.

25. A junction according to claim 23, wherein the members are telecommunication cables.

26. A junction according to claim 23, in which the members are pressurized cables.

27. A method of protecting elongated members comprising providing a heat-shrinkable, wrap-around sleeve having a corrugated layer sandwiched between two layers, said sleeve having grooved flanges along both longitudinal edges; wrapping said sleeve around the member and bringing said longitudinal edges together; holding said longitudinal edges together with a flexible clamping channel; and applying heat to heat-shrink the sleeve onto said member.

28. A method according to claim 27, which includes, prior to wrapping the sleeve around said member, wrapping a liner around the member, said liner being constructed to enable a gradual transition to be made from the maximum diameter of the liner to a smaller diameter of the member extending from the liner and then wrapping the sleeve around said liner.

29. A method according to claim 27, wherein the member is a cable having a plurality of cable portions extending from the sleeve.

* * * * *